May 17, 1966 F. E. VANDAVEER, JR 3,252,008

SELECTION OF THE HIGHEST OR LOWEST OF TWO OR MORE CURRENTS

Filed Oct. 14, 1963

United States Patent Office 3,252,008
Patented May 17, 1966

3,252,008
SELECTION OF THE HIGHEST OR LOWEST OF TWO OR MORE CURRENTS

Frederick E. Vandaveer, Jr., North Chili, N.Y., assignor to Taylor Instrument Companies, Rochester, N.Y., a corporation of New York
Filed Oct. 14, 1963, Ser. No. 316,100
12 Claims. (Cl. 307—88.5)

This invention relates to electrical current selecting systems, wherein a single load resistance and a plurality of current sources are interconnected by current selector means automatically operative to cause a value of current to flow through said load resistance, which value corresponds to the more or the most extreme value of current that could be driven through said load resistance by one of said current sources. Thus, it may be a case of selection corresponding to the lower of two currents or the lowest of more than two currents, or it may be a case of selection corresponding to the higher of two currents, or the highest of more than two currents.

Such systems are known in the art, such as, for example, those described in U.S. Letters Patent No. 3,135,872, granted June 2, 1964, on the copending application of N. B. Nichols, No. 126,184, filed July 21, 1961, entitled "Extremum Control Systems and Extremum Selectors Therefor," and assigned to the assignee of the present application, and have particular application to process control, as set forth, for example, in the said copending application.

It is the main object of this invention to provide improvements in such current selecting systems, in particular to provide for "bumpless" selection even though the current sources in such systems are so-called reset controllers.

Figure 1:
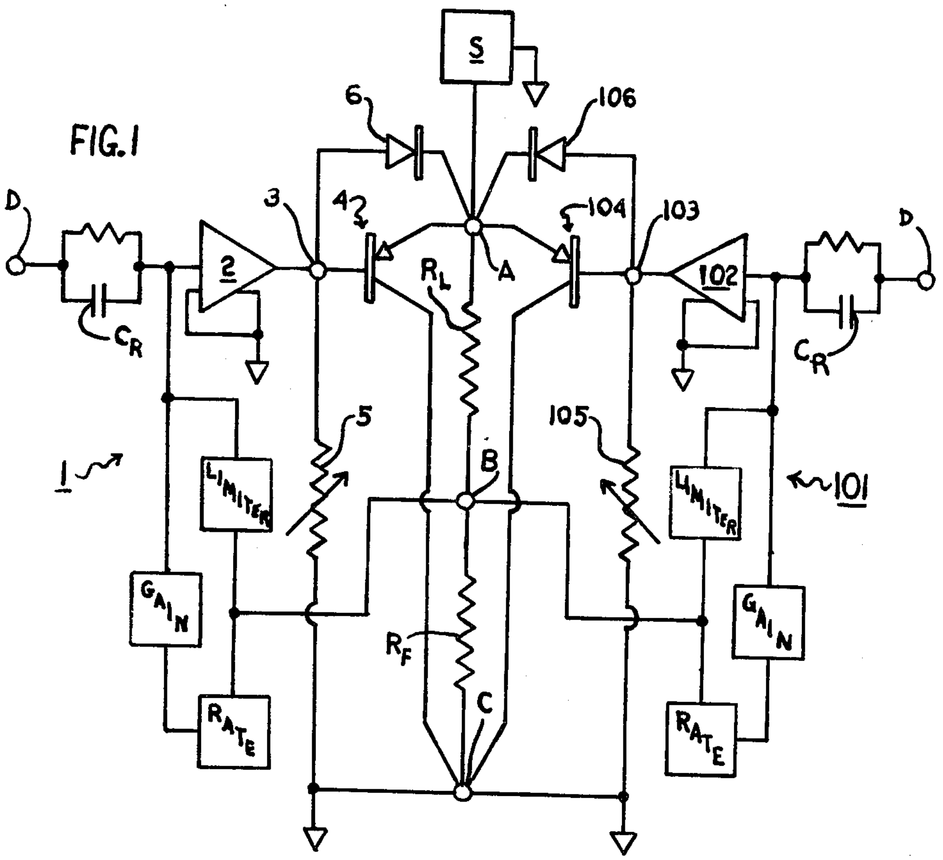
Figures 2, 3:
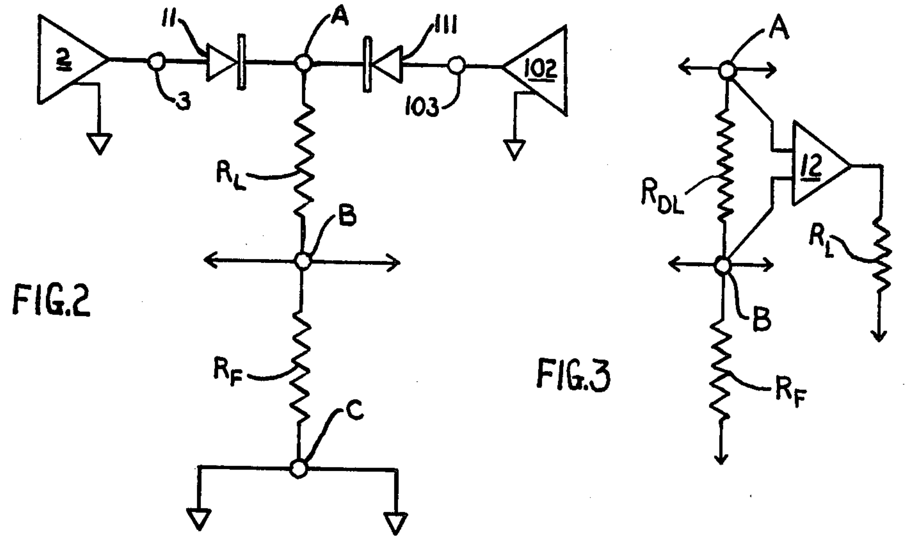

In the drawings, FIGURE 1 illustrates a low current selecting system, whereas FIGURE 2 illustrates a high current selecting system.

In FIGURE 1, one current source is represented by a controller 1 of the sort disclosed in U.S. Letters Patent No. 3,127,105, granted March 31, 1964, on a second copending application of N. B. Nichols, No. 840,157, filed September 15, 1959, entitled "Controller Improvements Including Bumpless Gain Control and Prevention of Reset Wind-up," and assigned to the assignee of the present application, to which reference should be had for detailed description of said controller. For present purposes, it suffices to say that controller 1 is essentially an electrical amplifier 2 provided with input and feedback circuitry such that the amplifier output may be proportional to the difference between a pair of inputs to the amplifier, to the duration of non-zero values of said difference and, frequently, to the rate of change of said difference.

In FIGURE 1, rate and proportional elements are indicated as boxes labeled Rate and Gain, respectively, since the details of these elements are not relevant to the purposes of the present application. However, it will be seen that the difference-input to the amplifier is via an RC section, including capacitor $C_R$, known as a reset capacitor since, for a given resistance in parallel thereto, its magnitude determines the controller constant known as "reset rate," because when it charges or discharges, the amplifier output changes as a result.

A second current source is also provided in the form of a controller 101, including an amplifier 102 having a reset capacitor $C_R$, rate and proportional elements, etc. While it is convenient to consider both controllers identical, this need not be the case, as long as each includes the equivalent of capacitance involved in feedback between amplifier input and output and providing reset action by charging and discharging of such capacitance. Amplifiers 2 and 102 are provided with output terminals

3 and 103, respectively, between which and circuit common, amplified output voltages appear.

In the type of controller in question, current controlled feedback is provided in the form of the voltages across a feedback resistance traversed by a load current driven by the amplifier between its output terminal and its circuit common, via a load resistance (corresponding to $Z_L$ in the said earlier-filed Nichols application). According to FIGURE 1, a load resistance $R_L$ and a feedback resistance $R_F$ are provided, but these are shared by both controllers.

Supposing $R_L$ to be the effective resistance appearing across a pair of terminals A and B, and $R_L$ to be connected between terminal B and a terminal C which is connected to circuit common of each amplifier, the selection action desired is that the voltage drop between terminals A and C corresponds to that between one of amplifier output terminals 3 and 103, and circuit common.

To this end, transistors 4 and 104 are provided, the former to interconnect terminals 3 and A, the latter to connect terminals 103 and A, the bases of said transistors being connected to the respective output terminals 3 and 103, each transistor emitter being connected to terminal A, and the transistor collectors each being connected to circuit common. Also, a variable output resistor 5 is connected between the base of transistor 4 and circuit common, and a variable output resistor 105 is connected between the base of transistor 104 and circuit common. Taking the transistors to the PNP, as illustrated, and terminals 3 and 103 to be positive with respect to circuit common, then current will flow from emitter to collector in each transistor as long as its emitter is positive with respect to its base, and the emitter voltage will follow the base very closely.

However, as the transistor emitters are connected together, each will have the same voltage, and that voltage will be substantially the same as the lower one of the transistor base voltages, hence, the other transistor base voltage will be higher than the voltage at terminal A, and only the transistor with the lower base voltage will conduct between its emitter and collector. As a result, if the series resistance of $R_L$ and $R_F$ is not so high as to prevent the conducting transistor from acting as a current source, then the load current through $R_L$ will be substantially the same as if terminal A were connected directly to the corresponding one of terminals 3 and 103, say terminal 3, i.e., the low current output is effectively that of controller 1. However, resistor 5 and the emitter-collector path of transistor 4 also draw current, and to insure the current demand of the load is met at all times, it is desirable to provide additional load-current supplying means.

Additional current may be provided by adding the diodes 6 and 106, so that current is, in the present example, shunted from resistor 105 by diode 106 to $R_L$ and $R_F$, in series, and to the emitter-collector path of transistor 4, in parallel with $R_L$ and $R_F$. In addition, or instead, more current may be supplied with a constant current supply S of any suitable character, connected between terminal and circuit common. Diode 6, of course, is not conducting at this time.

However, diodes 6 and 106 have utility over and above providing current for the load. In the case just considered, i.e., transistor 4 conducting, amplifier output terminal 103 is, in effect, disconnected from terminal B, hence, feedback to the gain, rate and reset circuitry of amplifier 102 is from the output terminal 3, in effect. As a result, amplifier 102 is driven into saturation, so that transistor 104 could be damaged by excessively high base voltage, but for diode 106, which not only passes excess current to the load and the conducting transistor, but also provides a small voltage drop assuring that the base of transistor 104 remains positive with respect to its collector until or unless the input to either amplifier changes enough to make the voltage at terminal 103 positive with respect to the emitter of transistor 104.

The situation described above, i.e., transistor 4 conducting, will be maintained until the voltage at terminal 3 becomes just larger than that at terminal 103. When this happens, transistor 4 will stop conducting, transistor 104 will begin to conduct, and all will be as before except now the controllers 1 and 101 will interchange roles.

In any event, at all times both reset capacitors $C_R$ are being charged by feedback from the same amplifier output terminal, and the voltages at the terminals connecting the reset capacitors to their respective amplifiers will be nearly the same, hence, when control is switched from one controller to the other, no drastic change can occur in output current, for the state of charge on the capacitor $R_C$ of the controller newly under control, makes the same controller produce an output such that changes, if any, in load current, start at the value existing just as the other controller relinquished control. However, had the reset capacitor of the newly-controlling controller been left to its own devices, during the time the other controller was in control, then the charge on this reset capacitor might have been such as to cause the newly-controlling controller to begin its control at a level of load current substantially instantaneously different than the load current existing at the moment it began to control.

Since the inputs to the controllers may reflect the response of some process environment to an effect created by the entity corresponding to load resistance $R_L$, and since such effect would be a function of the load current, sudden changes in load current would be reflected back to the control system as a disturbance in the process environment, to be coped with by the control system. Since the control system has the task of coping with disturbances otherwise arising in the process environment, it is obvious that a control system should not increase its control task by being itself a source of such disturbance.

In use, each of the resistors 5 and 105 is to be matched to $R_L$ and $R_F$, in series, in such fashion that the same control current flows therethrough as flows through $R_L$, when its controller is controlling the load current.

Preferably, resistors 5 and 105 should be adjusted prior to actual use of the control system for its intended purpose. Adjustment may be carired out by connecting the controllers 1 and 101 to a suitable load resistance $R_L$ and providing inputs to amplifiers 2 and 102 such that the current through each of $R_L$, and the currents through output resistors 5 and 105 are each at the same maximum value. This is done by applying sufficient difference signal to each controller, and by adjusting output resistors 5 and 105.

The difference signal is then decreased for one controller until the load current is about 10% off the previous value, and then the output resistor of the other controller is adjusted until the current through it is about the same as the load current. After this, it is necessary to increase the difference signal into said one controller until the original value of its output resistor current is reached, at which time load current is again reduced about 10%, but this time by decreasing the difference signal into the other controller.

Now the said other controller's output resistor is adjusted until both load current and current in the last said output resistor are each 10% off the original load current whereupon output resistor current is restored to the original value by increasing the difference signal to said other controller.

It will be noted that the output resistor, diode and transistor circuit of each of controllers 1 and 101 is connected in parallel with its fellow to $R_F$ and $R_L$, in series. One or more controllers may each be outfitted with an output resistor, diode and transistor circuit, and also paralleled with controllers 101 and 102. As a matter of fact, controllers may be disconnected and connected from $R_L$ and $R_R$ while the control system is in operation, because as long as no controller disconnected or connected is producing an output voltage lower than that of the controller in control, no distrubance is created in the system by the act of connection and disconnection.

The output resistors 5 and 105 assure that each of the amplifiers 2 and 102 is loaded for operation as a current source at all times. It is important that the amplifiers have high gain in order to assure quick transition of control from one controller to the other.

It will be observed that the selector system of FIGURE 1 works on the principle of regulating the drop across $R_L$ and $R_F$, in series, so that such drop is substantially equal to the drop that would occur across $R_L$ and $R_F$, in series, if the controlling current source only were connected to the $R_L$ and $R_F$, i.e., as in conventional single-controller systems such as disclosed in the said earlier-filed Nichols application. In the circuit configuration shown, each transistor is the essence of such a regulator, but is inoperative to act as such unless its base voltage is smaller than any of the others (actually, it may become equal and still be considered to be regulating, as long as it has theretofor been less or least, and all other base voltages are either equal to it or greater).

In order to provide for selecting the higher or highest current, for control, a pair of diodes 11 and 111 may be used, connected as shown in FIGURE 2. Since the current sources, i.e., the controllers, including amplifier, input and output circuitry, and connections to $R_F$ and $R_L$ may be the same as in FIGURE 1, only the manner of incorporating the diodes 11 and 111 is illustrated in FIGURE 2. As is evident from the drawing, if the voltage at terminal 3 is higher than that at terminal 103, current will flow through diode 11 through $R_L$ and $R_F$, in series. On the other hand, diode 111 prevents flow back to terminal 103, and at the same time is back-biased against allowing current to flow via diode 111 from terminal 103 to the load.

Accordingly, terminal 103 is effectively disconnected from the feedback circuit of controller 101, and, as before, the feedback applied thereto is under control of the load current due to controller 1, as the feedback circuits of each source are connected, as before, to terminal B, and terminal C is circuit common for both amplifiers.

If the voltage at terminal 103 increases over that at terminal 3, the current sources interchange roles bumplessly, as before, because the reset capacitances of both controllers are under control of the same load current at all times, no matter which controller is controlling.

As before, any number of current sources may be paralleled across $R_L$ and $R_F$ as are sources 1 and 101, each, of course, being provided with a diode interconnecting its output terminal with terminal A. In FIGURE 2, the diodes are shown poled for positive output terminals. For amplifier output terminals negative with respect to circuit common, diode polarity would be reversed.

Use of the diodes as high current selecting means does not necessitate adjustment of the control system prior to use. Moreover, current supply need not be supplemented, for the function of selection does not itself contribute to the current load. Each controller is designed so that $R_L+R_F$, in series, would see sufficiently high internal impedance, if connected directly between the amplifier output terminal and circuit common, that the load would perform as if fed by a current source capable of satisfying any expected demand of the load represented by $R_L$ and $R_F$ in series. In FIGURE 1, the selection action involves current drain that may become beyond the capability of the controlling amplifier, but the simple diode arrangement in FIGURE 2 imposes no such additional drain.

In the high selecting system of FIGURE 2, the effect is as if the controlling controller alone is connected to $R_L$ and $R_F$, and is connected thereto exactly as the controller of the said earlier-filed Nichols application is connected to $Z_L$ and $R_3$. That is, there are no transistors and output resistors such as are used in the low selecting system of FIGURE 1, and the diode of the controlling controller presents only its very low forward resistance to current flow between the output terminal of the controlling controller and terminal A.

Again, in the system of FIGURE 2, controllers may be disconnected and connected, without disturbing the control system, provided the output voltages of the disconnected and connected controllers do not surpass that of the controller in control.

The difference signals, referred to previously, are, of course, applied between input terminals D of the controllers and circuit common, and may be derived as disclosed in the aforesaid earlier-filed Nichols application. Circuit common, represented in the figures by inverted triangles may be the chassis of the amplifiers of the controllers, electrically tied together at terminal C. The boxes labelled LIMITER represent controller-output limiting circuitry, such as disclosed in the said earlier-filed Nichols application.

In certain types of multi-controller systems, the controller task is to prevent a given process variable from surpassing some limit, for safety's sake, say. In such cases as these, a low selector may be used as a high selector, and vice versa, by substituting, as shown in FIGure 3, a dummy load resistance $R_{DL}$ for $R_L$. The function of $R_{DL}$ is to provide the electrical equivalent of $R_L$ insofar as current selection is concerned. The real load resistance $R_L$, of a valve positioner, or other control device, however, is connected by means of a reversing amplifier 12 to terminals A and B. Reversing amplifier 12 is so constructed as to produce a current in $R_L$ that is inversely proportional to the current in $R_{DL}$. Thus, if the current in $R_{DL}$ ranged from 1 to 5 ma., D.C. the current in $R_L$ would range from 5 to 1 ma., D.C.

The modification shown in FIGURE 3 is applicable to each of the systems of FIGURES 1 and 2, without change therein except to substitute $R_{DL}$ for $R_L$, connect amplifier 12 to sense the drop across terminals A and B, and connect $R_L$ to the output of amplifier 12.

While each system actually selects as described in FIGURES 1 and 2, in FIGURE 3, the opposite effect is ultimately had. Thus, the controllers may be sensing a plurality of variables that, for the time being cause each controller to sense a need for 3 ma. through the load resistance of the control device. In this circumstance, 3 ma. flows through $R_L$. Subsequently, however, one of the variables exceeds a safe limit and causes one controller to call for 5 ma. of load current. Supposing the controllers to be provided with the high selector of FIGURE 2 modified in accordance with FIGURE 3, the controller providing 5 ma. takes over $R_{DL}$, but then amplifier 12 decreases the current in $R_L$ to 1 ma. In effect, then, the occurrence of a high controller current results in the selection of low load current.

One example of a system of this sort would be a pump feeding a number of lines, or the like, there being a controller sensing the pressure in each line, and each controller producing 1 ma. when its line pressure is within permissible bounds. Here, when any line pressure rises above its normal level, lowering pumping pressure, or the like, will drop the abnormal line pressure. Hence, the system of FIGURE 2, modified as in FIGURE 3, may be used to interconnect the controllers and, if $R_L$ represents a means for controlling the pump, will keep all pressures within the desired bound.

The foregoing description is set forth in order to meet the requirements of the first paragraph of 35 USC 112. I have not deemed it necessary to elaborate upon the detail of controller construction and function and of particular uses of extremum control systems, for such detail is within the realm of the prior art knowledge, and I consider the disclosure of both Nichols applications, identified herein above, to be incorporated as part of the disclosure of the present application, should reference to such detail be desired.

I claim:

1. An extreme current selecting system having a plurality of amplifiers, each having a reset capacitance associated therewith, the outputs of which amplifiers are direct currents, the magnitude of each such direct current being a function of the state of charge of the corresponding reset capacitance, said system also having a single load resistance and a single feedback resistance, the former said resistance being connected in series with the latter said resistance, and the resulting series resistance being connected between each of the said outputs, on one hand, and each circuit common of said plurality of amplifiers, on the other hand; and each said reset capacitance being connected, for charging and discharging, to the connection between said feedback resistance and said load resistance; and selector means in each connection between said series resistance and said outputs, said selector means being constructed and arranged such that the voltage across said series resistance corresponds to that voltage, between a said output and circuit common, which is not less extreme than any other voltage between any other of said outputs and circuit common.

2. The invention of claim 1, wherein said selector means includes one diode individual to each said amplifier, so that there are as many diodes as amplifiers; each said diode being connected between the output of its associated amplifier and said series resistance, each output having the same polarity with respect to circuit common, and each diode being poled to pass current between the output of its associated amplifier and said series resistance when said current corresponds to the polarity of the last said output with respect to circuit common.

3. The invention of claim 1, wherein said selector means includes one transistor individual to each said amplifier, so that there are as many transistors as amplifiers; each said transistor having its base connected to the output of its associated amplifier, its emitter connected to said series resistance at the end thereof electrically most remote from circuit common, and its collector connected to circuit common.

4. The invention of claim 3, including a plurality of output resistors, there being one said output resistor for, and individual to, each said amplifier, each said output resistor being connected between the base of the transistor of its associated amplifier and circuit common, each said resistor matching said series resistance such that when current flows in said load resistance, current of substantially equal value flows in that one of said output resistors across which the voltage drop is not more than the voltage drop across any other of said output resistors.

5. The invention of claim 3, including a plurality of diodes, one for, and individual to, each said transistor, and connected between base and emitter of such transistor, each said diode being so poled that it blocks current flow between the output of the amplifier to which is associated the last said transistor, and the connection of said transistor to said series resistance.

6. The invention of claim 3, including a constant current supply connected across said series resistance.

7. In a system for selecting the high direct current of a plurality of current sources each having an output terminal effectively connected to a load resistance, each of said current sources having the same circuit common, and there being means connecting said load resistance to circuit common for direct current flow between one of said sources through said load resistance and circuit common; the improvement comprising diodes directly connecting said output terminals to said load resistance, there being one diode for, and individual to, each of said current sources, each of said output terminals having the same polarity with respect to circuit common, and each of said diodes being poled so as to pass current flowing in the sense of said polarity.

8. In a system for selecting the low direct current of a plurality of current sources, each having an output terminal effectively connected to a load resistance, each of said current sources having the same circuit common, and there being means connecting said load resistance to circuit common for direct current flow, through said load resistance, with respect to circuit common; the improvement comprising, transistors connecting each of said output terminals to circuit common, there being one transistor for, and individual to, each of said current sources, each of said transistors having its base connected to the output terminal of its associated current source, its emitter connected to said load resistance at the end thereof electrically remote from circuit common, and its collector connected to circuit common, said output terminals each having the same polarity with respect to circuit common, and the polarity of each transistor being such that current flows between its emitter and collector when the polarity of its emitter with respect to its base is the same as that of circuit common with respect to its said base.

9. The invention of claim 8, wherein said improvement includes diodes connecting base and emitter of each of said transistors, there being one of said diodes for and individual to, each of said transistors, each of said diodes being poled to pass current in the direction of flow of current in said load resistance.

10. The invention of claim 8, wherein said improvement includes output resistors connecting said output terminals to circuit common, there being one of said output resistors for, and individual to, each of said output terminals, each of said output resistors being proportioned to pass the same current as said load resistance, if the associated transistor conducts current between emitter and collector.

11. The invention of claim 8, including a constant current supply connected to supply current to said series resistance.

12. In combination, a plurality of controllers, each having an output and each being constructed and arranged to cause a current to flow through a load resistance connected to its output; a dummy load resistance, and extreme current selector means, said selector means interconnecting said dummy load resistance to the outputs of said controllers, and being responsive to connect that output to said load resistance that corresponds to the controller that could cause an extreme value of current to flow through said dummy load resistance; a reversing amplifier, said reversing amplifier being effectively responsive to current flow in said dummy load resistance to cause current flow in a real load resistance connected to said reversing amplifier, but such that the last said current flow is inversely proportional to current flow through said dummy load resistance.

No references cited.

ARTHUR GAUSS, *Primary Examiner*.

J. BUSCH, *Assistant Examiner*.